United States Patent [19]

Fujita

[11] 4,210,782
[45] Jul. 1, 1980

[54] DISTRIBUTED CONTROL TYPE TELEPHONE SWITCHING SYSTEM

[75] Inventor: Kazunori Fujita, Tokyo, Japan

[73] Assignee: Nippon Electric Co., Ltd., Tokyo, Japan

[21] Appl. No.: 917,342

[22] Filed: Jun. 20, 1978

[30] Foreign Application Priority Data

| Jun. 23, 1977 | [JP] | Japan | 52/74862 |
| Jun. 23, 1977 | [JP] | Japan | 52/74863 |
| Aug. 8, 1977 | [JP] | Japan | 52/95301 |
| Dec. 9, 1977 | [JP] | Japan | 52/147911 |
| Mar. 2, 1978 | [JP] | Japan | 53/24092 |
| Mar. 15, 1978 | [JP] | Japan | 53/30169 |
| Mar. 15, 1978 | [JP] | Japan | 53/30170 |
| Mar. 22, 1978 | [JP] | Japan | 53/33349 |

[51] Int. Cl.² .............................................. H04Q 3/54
[52] U.S. Cl. ................................................ 179/18 ES
[58] Field of Search ............. 179/18 ES, 18 E, 18 EA

[56] References Cited

U.S. PATENT DOCUMENTS

| 3,665,110 | 5/1972 | Gerke et al. | 179/18 EA |
| 3,812,297 | 5/1974 | Borbas | 179/18 ES |
| 3,969,701 | 7/1976 | Hemdal | 179/18 ES X |
| 3,974,343 | 8/1976 | Cheney et al. | 179/18 ES |
| 4,095,054 | 6/1978 | Anizan et al. | 179/18 ES |
| 4,113,988 | 9/1978 | Mukaemachi et al. | 179/18 ES |

FOREIGN PATENT DOCUMENTS

| 2502516 | 7/1975 | Fed. Rep. of Germany | 179/18 ES |
| 1319571 | 6/1973 | United Kingdom | 179/18 ES |

OTHER PUBLICATIONS

"AXE, A Functionally Modular SPC System, System Structure and Operation and Maintenance Features", International Switching Symposium, Munich, Germany, Sep. 1974.

"The Microprocessor Controlled 580 Digital Switching System", Pitroda et al., International Switching Symposium, Kyoto, Japan, Oct. 1976.

"New Digital Electronic PABX Family", Garavalia, International Switching Symposium, Kyoto, Japan, Oct. 1976.

*Primary Examiner*—Thomas W. Brown
*Attorney, Agent, or Firm*—Laff, Whitesel & Rockman

[57] ABSTRACT

A distributed telephone switching control circuit enables a plurality of separate switching networks to behave as if they were a single and integrated switching network. A data processor is individually associated with each separate network. Other data processors are common to all of the separate switching networks. The individual and common processors exchange signals to enable the separate networks to behave as if they were a single integrated network.

15 Claims, 13 Drawing Figures

DISTRIBUTED CONTROL TYPE TELEPHONE SWITCHING SYSTEM

BACKGROUND OF THE INVENTION

1. Field of the Invention

This invention relates to a distributed control type telephone switching system wherein central control functions are distributed to a plurality of micro-processors.

2. Prior Art

In a conventional electronic switching system, one central control circuit controls the overall system. This means that this central control circuit has a large processing ability and many functions. That is to say, this central control circuit performs the following controls in one processors:controls of various kinds of signals including the register control such as detection, counting, storage or the like of an address signal; trunk control such as detection of an incoming signal and detection of a disconnect signal; attendant console control such as detection, storage or the like of key information from attendant console or the like; and controls of various kinds of connections such as a dial tone connection, an extension-to-extension connection, outgoing and incoming connections with a central office, a tie line connection such as the one for a leased circuit, a tandem connection, an automatic transfer connection, an abbreviated dialling connection, an absence transfer connection, or the like. Accordingly, the processor needs to have a large processing ability and to be able to perform various functions.

Therefore, a processor designed for the exclusive use of switching control is needed. Such a high-capacity, multifunction processor is expensive and requires a large installation space. Furthermore, to increase the circuit capacity of the switching system, the development of another processor of higher processing ability is required. In addition, an extremely large amount of work is needed to modify programs for the modification of functions. The system configuration and the programs are dependent on the circuit capacity and on the variety of services provided by the switching system. Even in cases where the system is designed to be flexible as to the number of telephone circuits connectable thereto, the central control circuit needs to have a capacity large enough to handle the largest possible circuits, making the small-capacity system very costly to manufacture.

In addition, the inter-processor information transfer in conventional systems is performed by interrupting a first processor by a second processor to permit the read-out and write in at the memories under the control of the first processor. Therefore, the processors need to have an interruption function. Also, the program needs to be adapted to accommodate such an interruption from another processor, complicating the program as a whole, requiring memories of greater capacity, and adversely affecting the processing ability of the processor.

Furthermore, a larger amount of address information and more complicated interface circuits are needed for the memory to make it controllable by another processor. This combined with the above-mentioned need for the interruption function, makes the processor more complicated, larger-sized and more costly to manufacture.

SUMMARY OF THE INVENTION

With the above discussion in view, it is a principal object of the present invention to provide a distributed control type telephone switching system adapted to be optimized regardless of the circuit capacity and the variety of services provided by the switching system.

It is a second object of this invention to provide a distributed control type telephone switching system wherein the above mentioned central control function is assigned to a plurality of inexpensive, general purpose microprocessors.

It is a further object of this invention to provide a distributed control type telephone switching system wherein the inter-processor information transfer and programs therefor are simplified, thereby to decrease the memory capacity for the program.

According to the present invention, there is provided a distributed control type telephone switching system, which comprises: a speech path selecting circuit connected to a line circuit with a telephone unit connected thereto; a trunk circuit connected to a central office line; and a position circuit connected to an attendant console; a plurality of signal control processors connected to the speech path selecting circuit, the line circuit, the trunk circuit and the position circuit, respectively, for transmitting control signals to these circuits and for receiving signals from these circuits. At least one connection control processor is provided for instructing various connections between the speech path selecting circuit and the line circuit, the trunk circuit and the position circuit. An information transferring means is connected to the signal control processors and the connection control processor for performing the transmission and reception of switching control signals between the processors; whereby switching control functions are distributed to the processors.

According to this invention, an optimumized system can be obtained for any number of telephone circuits or for any degree of variety of services to be provided, by the use of a control system commonly applicable to various sizes of the switching control system. More specifically, the control system of this invention is applicable not only to a small capacity telephone switching system of less than 100 circuits but also to a large capacity system of more than tens of thousands of circuits. Similarly, the present control system is applicable to an ordinary private branch exchange, a CENTREX, an intra-office exchange, data exchange, and the like. Also, the present invention makes the cost of the central control circuit substantially proportional to the number of telephone circuits, thereby making small-capacity systems more economical.

In addition, the use of the single control system in this invention helps to standardize hardware and software of the central control circuit, facilitating the design work and the cost reduction.

Furthermore, the present invention makes it possible to use inexpensive general purpose microprocessors as the central control circuit of the switching system. A general purpose microprocessor now available at a reasonable price is so slow in its processing period that one processor can handle the switching of only about 100 to 200 circuits. The use of a plurality of such low-cost microprocessor, constituting a multiprocessor control circuit, achieves the control for processing speed, which is compensated even for the switching of a large capacity telephone exchange system.

Broadly stated, this invention is based on the splitting into several blocks of the control functions of the control system in an automatic switching system. Inexpensive general purpose microprocessor are assigned respectively to the blocks, so that the overall functions of the control system may be shared by such microprocessors. Also, the present invention with the interruption function for the inter-processor information transfer. This makes it possible to employ microprocessors of smaller processing capacity, i.e., those small-sized inexpensive ones with smaller capacity of memory directly addressable from the processors. Furthermore, due to the absence of the above-mentioned interruption function, the program is much simplified, helping reduce the memory capacity.

Another aspect of the present invention provides an interprocessor information transfer control system adapted to the distributed control type telephone exchange system employing a great number of microprocessors. This helps reduce the overall cost of the distributed control system employing the processors.

With these objects, features and advantageous effects of this invention in mind, the following description, by way of nonlimiting embodiments, is given in conjunction with the accompanying drawings.

BRIEF DESCRIPTION OF THE DRAWINGS

FIGS. 4A;14 4I is a timing chart illustrating various timings in the information transfer circuit shown in FIG. 3.

DESCRIPTION OF THE PREFERRED EMBODIMENTS

Figure 1:
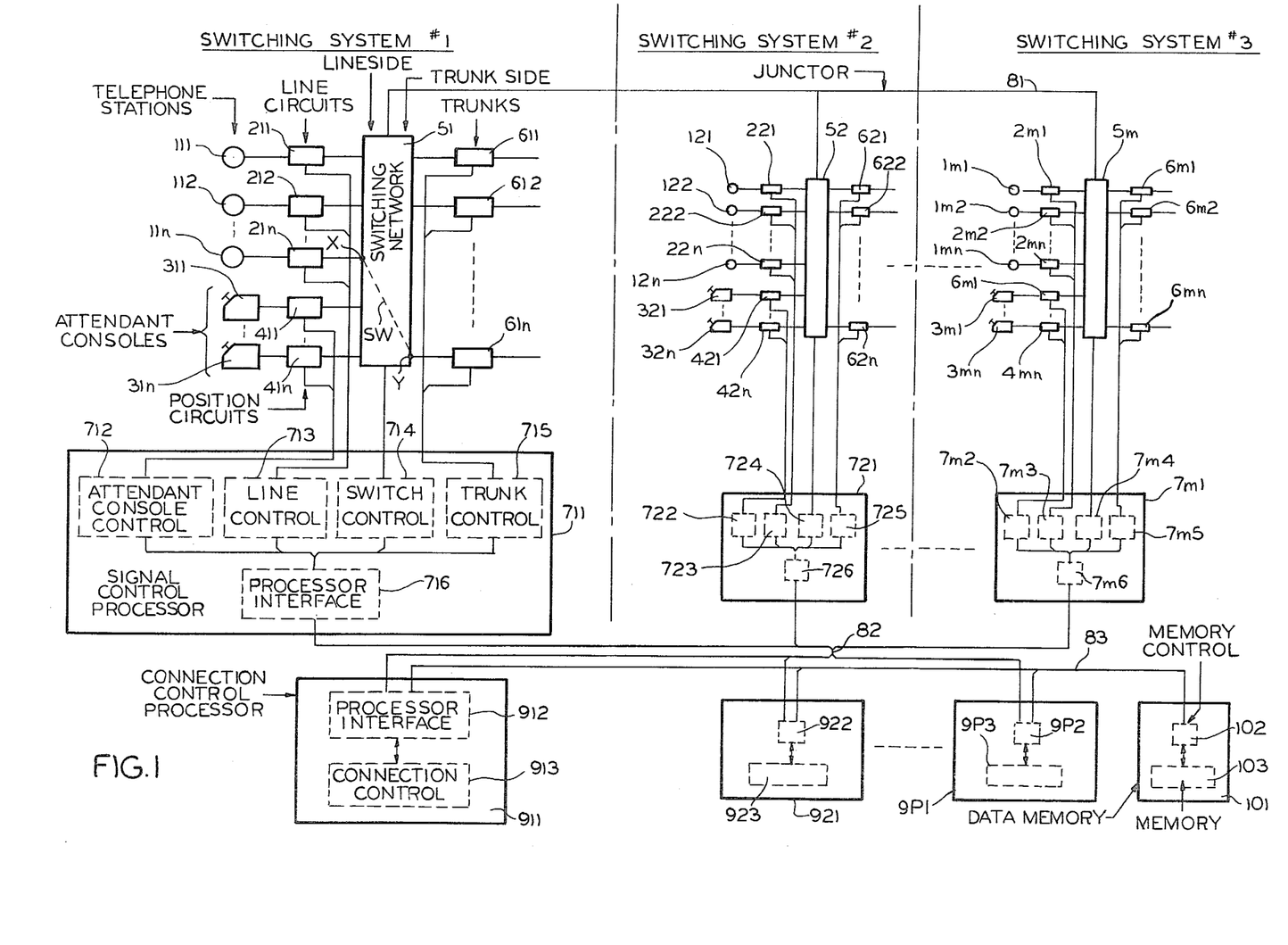
FIG. 1 is a block diagram showing an embodiment of this invention.

A distributed control telephone switching system according to this invention is outlined in FIG. 1 by way of a combination of hardware construction and functional blocks. This figure shows three separate switching systems which are set apart by vertical dot-dashed lines. For purposes of this description, these may be brought of as three identical switching systems. Each of these three switching systems has its own individually associated separate switching networks (i.e., Switching System #1 has individually associated separate network 51; Switching System #2 has its separate network 52; and Switching System #3 has its separate network 5m). Each switching network has a line side on the left and a trunk side on the right, with speech path switches for selectively interconnecting predetermined points of access on the line side and the trunk side. For example, speech path SW is shown in FIG. 1 as interconnecting the line side access point X with the trunk side access point Y.

Each of the separate switching networks has its own individually associated processors (e.g., switching network 51 has its individually associated switching network processor 711). In addition, there are common processors 911, 921, and 9P1 which are interconnected by data busses 82. These processors exchange signals between themselves to enable all of the switching systems to behave as if they were severed by a single and integrated network.

In greater detail, in FIG. 1, a switching network 51 has line side terminals to which extension telephones 111, 112, . . . , 11n are connected via line circuits 211, 212, . . . 21n, respectively. Attendant consoles 311, . . . 31n are also connected to the line side of network 51 via position circuits 411, . . . , 41n, respectively. The switching network 51 also has trunk side terminals to which trunks 611, 612, . . . 61n are connected, respectively. Similar connections are applied to switching networks 52, . . . 5m. The switching networks 51, 52, . . . 5m are connected to one another by a junctor 81 to form a switching network system, by joining these switching networks as a whole.

A signal control processor 711 is provided to control the reception and transmission of various control signals with respect to the extension telephones 111, 112, . . ., 11n, the line circuits 211, 212, . . . , 21n; the attendant consoles 311, . . . , 31n, the position circuits 411, . . ., 41n; the switching network 51; and the trunks 611, 612, . . . , 61n. Similarly, signal control processors 721, . . . 7m1 are provided for the same purpose as in the case of the signal control processor 711.

These signal control processors 711, 721, . . . , 7m1 are composed of several blocks, in terms of functions. The signal control processor 711, for example, is composed of an attendant console control block 712, a line control block 713, a switch control block 714, a trunk control block 715 and a connection control processor interface block 716, as shown by broken lines in FIG. 1.

The signal control processors 711, 721, . . . , 7m1 are connected respectively to the line circuits, the position circuits and the trunks which are connected to the line side terminals, and to the trunk side terminals of the corresponding switching networks. These signal control processors have the functions of performing the control for detecting a control signal received from an external equipment. They also provide the control for transmitting a control signal to the external equipment from the line circuit, the position circuit, the trunk or the like. They control switches in the switching networks and provide an interface function with a connection control processor.

The attendant console control block 712 detects and stores key information transmitted from the attendant console, controls lamps and buzzers of the attendant console, and analyzes the key information. The line control block 713 detects call information sent from the extension telephones, controls the transmission of a ringing signal to the extension telephones and detects responding information sent from the extension telephone. The switch control block 714 controls speech path switches, a speech path switch memory, and a connecting condition memory. The trunk control block 715 controls the detection, counting and storage of an address signal transmitted from the extension telephones, detects an on or off hook signal sent from the extension, detects a release signal sent from the extension, detects a terminating signal transmitted from the opposite station, detects a backward signal transmitted from the opposite station, detects an answer signal transmitted from the opposite station, detects a release signal from the opposite station, controls the detection, counting and storage of an address signal transmitted from the other station, controls the transmission of a seizure signal to the opposite station, controls the transmission of an address signal to the opposite station, controls the transmission of a connection confirmation signal to the opposite station, controls the transmission of an answer signal to the opposite station, controls the transmission of a release signal to the opposite station, and performs the pretranslation of the address signal sent from the extension telephone or the opposite station.

The connection control processor interface block 716 judges trigger conditions of the connection control processors and controls the transfer of control information between the connection control processors.

Next, connection control processors 911, 921, . . . , 9P1 are triggered by the trigger demand from the signal control processors to perform various connection controls, such as: a dial tone connection, interconnection between the extensions, originating connection to central office, terminating connection from central office, tie line connection, tandem connection, automatic transfer connection, abbreviated dial connection, and variable absence transfer connection. The connection control processor is composed of a signal control processor interface block 912 and a connection control block 913. The signal control processor interface block 912 judges whether the signal control processor 711 produces a trigger requirement to the connection control processor 911. If the trigger demand is produced, then the signal control processor interface block 912 accepts that trigger demand to perform the control of discriminating a type of the trigger, the control of transferring the control information between the signal control processor and the connection control processor, and so on. The connection control block 913 performs various connection controls such as dial tone connection, extension-to-extension connection, originating connection to central office, terminating connection from central office, tie line connection, tandem connection, automatic transfer connection, abbreviated dial connection, variable absence transfer connection and so on.

The signal control processors 711, 721, . . . , 7m1 1 and the connection control processors 911, 921, . . . , 9P1 are connected by a bus 82, i.e., a control information transfer lead (bus). Further, the signal control processors and the connection control processors do not have a fixed corresponding relationship with each other. In other words, the signal control processors 711 is provided so that the signal control processor corresponds to various kinds of equipment group such as line circuit, position circuit, trunk and switching network. The connection control processor 911 does not correspond to the switching network and various equipment connected to the switching network in a fixed fashion. Thus the control information is transferable between all of the signal control processors via this connection control processors. For instance, the connection control processor 911 can allow the transfer of the control information between the respective signal control processors 711, 721, . . . , 7m1 via the bus 82. In a similar way, the connection control processors 921, . . . , 9P1 can allow the transfer of the control information between all of the signal control processors 711, 721, . . . , 7m1 via the respective connection control processors. Thus, the connection control processors 911, 921, . . . , 9P1 equally have the same processing ability and functions, respectively. It follows that the number of the connection control processors 911, 921, . . . 9P1 is determined in accordance with the traffic of trigger demand to the connection control processors, from the signal control processors.

Data memory 101 is used for storing information required for the system such as number group information, and translator information. The data memory 101 is composed of a memory control block 102 and a memory block 103 which are constructed to enable the transfer of information between data memory 101 and the respective connection control processors 911, 921, . . . , 9P1. The connection control processors 911, 921, . . . , 9P1 are connected to the data memory 101 through a bus 83, i.e., an information transfer lead.

(a) Dial Tone Connection

Control operations for the dial tone connection will now be described. A call originating with the extension telephone 111 is transmitted to the line circuit 211. The line control block 713 in the signal control processor 711 is always scanning to find a line circuit which is in a calling condition. If a line circuit is detected by that scanning, the memory in the line control block stores the accommodated position information about the line circuit, at the line side terminal of the switching network. The line control block 713 detects the line circuit 211 which is in a calling condition by the scanning. The accommodated position information of the line circuit 211 at the line side terminal of the switching network 51 is stored in the memory in the line control block 713.

The line control block 713, having thus detected the call, transmits a dial tone connection trigger demand signal to the connection control processor interface block 716. A connection control processor trigger flag memory in the connection control processor interface block 716 stores the dial tone connection trigger demand signal. On the other hand, the signal control processor interface block in the connection control processor which is out of the execution of the connection control detects whether or not the trigger demand is received from the signal control processor, when the trigger demand is received from the signal control processor. This detection is done by checking whether or not the trigger flag has been written in the connection control processor trigger flag memory in the connection control processor interface block in the signal control processor.

Assume now that the connection control processor 911 is not executing another connection control, but is detecting the trigger requirement from the signal control processor. The signal control processor interface block 912 scans the connection control processor trigger flag memories in the connection control processor interface blocks 716, 726, . . . , 7m6, sequentially so as to detect the dial tone connection trigger demand from the signal control processor 711. The connection control processor trigger demand flag memories in the interface blocks 716, 726, . . . , 7m6 store the trigger requirement flag pulses to the connection control processors such as dial tone connection trigger demand signal, extension interconnection trigger demand signal, originating connection trigger demand signal to central office, terminating connection trigger demand signal from central office, tie line originating connection trigger demand signal, tie line terminating connection trigger demand signal, tandem connection trigger demand signal, automatic transfer connection trigger demand signal, abbreviated dial connection trigger demand signal, variable absence transfer connection trigger demand signal, and so on.

When the connection control processor 911 detects the trigger demand supplied from the signal control processor 711, the control information is transferred through the bus 82. When the interface block 912 in the processor 911 which has received the connection trigger demand from the signal control processor 711 decides that the trigger demand is for a dial tone connection, the interface block 911 transmits the trigger signal to the connection control block 913.

When the dial tone connection control is initiated, the connection control block 913 first supplies an instruction asking for the transmission of the accommodated position information on the line side of the switching network 51 relating to the calling extension telephone 111 to the line control block 713 via the interface block 912, the bus 82 and the interface block 716. The line control block 713 supplies, in response to this instruction, the accommodated position information with respect to the calling extension telephone 111 to the connection control block 913 in the connection control processor 911 via the interface block 716, the bus 82 and the interface block 912.

The connection control block 913 supplies an instruction by asking for the transmission of trunk type information stored in the trunk control block 715 in the signal control processor 711 and idle-busy information, from the trunk control block 715. Information is supplied via the interface block 912, the bus 82 and the interface block 716 in order to select a vacant originating register trunk. The trunk control block 715 supplies, in response to this instruction, the trunk type information and the idle-busy information to the connection control block 913 via the interface block 716, the bus 82 and the interface block 912.

The connection control block 913 selects the vacant originating register trunk in accordance with these trunk type information and idle-busy information. The accommodated position information relating to that trunk on the trunk side of the switching network 51 is stored in the connection control block 913. Assume now that the trunk 611 is the vacant originating register trunk in question. The accommodated position information relating to the trunk 611 in the switching network 51 is stored in the connection control block 913.

Then, the connection control block 913 supplies an instruction by asking for the transmission of the idle-busy information of a link, the information being stored in the switch control block 714 in the signal control processor 711. This information is transmitted to the switch control block 714 via the signal control processor interface block 912, the bus 82 and the interface block 716 in order to select a vacant channel for connecting the calling extension telephone 111 with the originating register trunk 611. The switch control block 714, which has received this instruction, supplies the idle-busy information of the link to the connection control block 913 via the connection control processor interface block 716, the bus 82 and the signal control processor interface block 912.

In accordance with this idle-busy information of the link, the connection control block 913 performs the matching of the link and selects the vacant channel for connecting the calling extension telephone 111 with the originating register trunk 611.

Control block 913 stores all of the accommodated position information relating to the calling extension telephone 111 and the originating register trunk 611, in the switching network 51. The channel information of how the switching network 51 connects the calling extension telephone 111 with the originating register trunk 611 is detected by the above connection control operations and stored in the connection control block 913. The accommodated position information in the switching network 51, the channel information of the switching network 51, and an instruction for closing a speech path switch are supplied to the switch control block 714 from the connection control block 913, through the signal control processor interface block 912, the bus 82 and the interface block 716.

In accordance with these instructions, the switch control block 714 closes the speech path switch in the switching network 51 to complete a speech path from the calling telephone 111 to the originating register trunk 611, via the line circuit 211 and the switching network 51. The originating register trunk 611 transmits a dial tone to the calling telephone 111 through this speech path. A memory in switch control block 714 stores the accommodated position information of the calling extension telephone 111, the accommodated position information of the originating register trunk 611 in the switching network 51, and the connection condition in the switching network 51, inclusive of the channel information in the connection condition. This information and an instruction for the write-in of the connection condition memory are supplied to the switch control block 714 from the connection control block 913 via the block 912, the bus 82 and the interface block 716. The switch control block 714, which has received this instruction, stores the above-mentioned information in the connection condition memory of block 714. Thereafter, the connection control block 913 transmits the disconnect signal to the interface block 716 via the interface block 912 and the bus 82, thereby to disconnect the connection control processor 911 and to complete the dial tone connection control operations.

The above described connection control operations cause a selection of a vacant originating register trunk contained in a switching network 52, . . . , 5m (other than the switching network 51 in which the calling extension telephone 111 is accommodated), if (1) the switching network 51 does not contain the originating register trunk, (2) there is no vacant originating register trunk even if the switching network 51 includes the originating register trunk, or (3) there is no vacant channel, even if the switching network 51 accommodates the vacant originating register trunk. If all of the originating register trunks contained in the switching network 51 are busy and if the trunk 621 included in the switching network 52 is a vacant originating register trunk, the connection control block 913 selects such trunk in the network 52 as a result of operations similar to the above-mentioned trunk selecting operations. The accommodated position information on the trunk side of the switching network 52 is stored in the connection control block 913.

The instruction for sending the idle-busy information stored in the switch control block 714 in the signal control processor 711 is then supplied to the switch control block 714 via the interface block 912, the bus 82 and the interface block 716 in order to select a vacant channel for connecting the calling extension telephone 111 with the originating register trunk 621. The switch control block 714 supplies, in response to this instruction, the idle-busy information of the link to the connection control block 913 via the interface block 716, the bus 82 and the interface block 912. Further, the connection control block 913 transmits an instruction for sending the idle-busy information of the link, stored in the switch control block 724 of the signal control processor 721, to the switch control block 724 through the interface block 912, the bus 82 and the interface block 726. The switch control block 724 sends, in response to this instruction, the idle-busy information of the link to the connection control block 913 through the interface block 726, the bus 82 and the interface block 912.

In accordance with the idle-busy information of the link, the connection control block 913 performs a matching of the link and selects a vacant channel for connecting the calling telephone 111 with the originating register trunk 621. The accommodated position information of the calling telephone 111 in the switching network 51, the accommodated position information of the originating register trunk 621 in the switching network 52, and the channel information relating to the switching networks 51 and 52 and the junctor 81 are produced by the above described connection control operations and are stored in the connection control block 913. The accommodated position information of the calling telephone 111, the channel information of the switching network 51, the channel information of the junctor 81 and the instruction for closing the speech path are supplied to the switch control block 714 from the connection control block 913 via the interface block 912, the bus 82 and the interface block 716. The accommodated position information of the originating register trunk 621 in the switching network 52, the channel information of the switching network 52, the channel information of the junctor 81 and the instruction for closing the speech path are supplied to the switch control block 724 from the connection control block 913 via the interface block 912, the bus 82 and the interface block 726.

In accordance with these instructions, the switch control block 714 closes the speech path switch in the switching network 51. The switch control block 724 closes the speech path switch in the switching network. This completes a speech path from the calling telephone 111 to the originating register trunk 621 via the line circuit 211, the switching network 51, the junctor 81 and the switching network 52.

As a result, the originating register trunk 621 transmits a dial tone to the calling telephone 111 through this speech path. The connection condition memory in the switch control block 714 stores the connection conditions of the switching network 51 inclusive of the accommodated position information of the calling telephone 111 in the switching network 51, and the channel information and the junctor information.

This information and an instruction of writing in the connection condition memory are supplied to the switch control block 714 from the connection control block 913 via the interface block 912, the bus 82 and the interface block 716. This information is thus stored in the connection condition memory of the switch control block 714.

The connection condition memory, in the switch control block 724, stores the connection conditions of the switching network 52, inclusive of the accommodated position information of the originating register trunk 621 in the switching network 52, the channel information and the junctor information. This information and a write-in command in the connection condition memory are supplied to the switch control block 724 from the connection control block 913 via the interface block 912, the bus 82 and the interface block 726. Thereafter, the connection control block 913 transmits a release signal to the interface block 716 via interface block 912 and the bus 82, and the connection control block 913 also transmits a release signal to the interface block 726 via the interface block 912 and the bus 82, so that the connection control processor 911 is disconnected.

(b) Extension-to-Extension Call Connection

Here, a description will be made of the extension-to-extension connection control operations. It is presumed here that the extension telephone 111 is already connected to the originating register trunk 611 via the line circuit 211 and the switching network 51 as described hereinabove. When the extension telephone 111 dials a directory number for another extension telephone for the switching system #1, the dialed number information is received by the originating register trunk 611. The received directory number information is detected in the trunk control block 715 in the signal control processor 711 and then stored in a number information storing memory in the trunk control block 715. The trunk control block 715 performs the pretranslation operation for determining the number of digits required for the reception, by discriminating the first digit in this stored number information. The completion of the reception of the number of digits required for the reception is detected by the trunk control block 715. Then, the trigger demand signal for triggering the extension-to-extension connection is stored in the connection control processor trigger flag memory in the interface block 716.

Suppose now that the connection control processor 911 is involved in the execution of no other connection control and detects the trigger demand from the signal control processor 711. The interface block 912 scans the connection control processor trigger flag memories in the interface blocks 716, 726, . . . , 7m6, sequentially so as to detect the trigger demand from the signal control processor 711. While the triggered interface block 912 recognizes that the trunk control block 715 in the signal control processor 711 has received some number information, this triggered interface block 912 does not recognize the type of the call with respect to the directory number information.

To discriminate the type of the triggered call, the interface block 912 supplies the first digit of the received directory number dial information to the memory control block 102 in the data memory 101 via the bus 83. In the memory control block 102, the call type information corresponding to the received number information is read from translator information in the memory block 103. This call type information is stored in the memory control block 102. This call type information is sent to the signal control processor interface block 912 of the connection control processor 911, from the memory control block 101 via the bus 83.

The interface block 912 which has received this information transmits the trigger signal to the connection control block 913 to initiate the extension-to-extension connection control corresponding to the above-mentioned call type information. Upon initiation of the connection control, a command for the accommodated position information of the calling extension telephone 111 in the switching network 51 is supplied to the switch control block 714 via the interface block 912, the bus 82 and the interface block 716. The switch control block 714 discriminates, in response to this instruction, the accommodated position information of the calling extension telephone 111 supplied from the connection condition memory in the switch control block 714.

The accommodated position information thus discriminated is supplied to the connection control block 913 via the interface block 716, the bus 82 and the interface block 912 for storage.

Subsequently, the instruction for sending the directory number information of the called extension telephone is supplied to the trunk control block 715 via the interface block 716, the bus 82 and the interface block 912. The trunk control block 715 supplies, in response to this instruction, the number information of the called extension telephone to the connection control block 913 in the connection control block 911, from the number information storing memory in the trunk control block 715, via the interface block 716, the bus 82 and the interface block 912.

In order to discriminate the accommodated position information on the line side of the switching network of the called extension telephone, the connection control block 913 supplies the number information of the called extension telephone which is stored in the connection control block 913 to the memory control block 102 in the data memory 101 via the interface block 912 and the bus 83. The memory control block 102 reads the line side accommodated position information of the switching network corresponding to the received number information from the number group information in, the memory block 103. The accommodated position information is stored in the memory control block 102.

Assume now that the called extension telephone is the extension telephone 112. The accommodated position information of the extension telephone 112 on the line side of the switching network 51 is stored in the memory control block 102. This accommodate position information is supplied to the connection control block 913 for storage from the memory control block 102 via the bus 83 and the interface block 912.

Next, to detect the idle/busy condition of the extension telephone 112, the connection control block 913 supplies the instruction for sending the idle-busy information relating to the extension telephone 112, which is stored in the line control block 713 in the signal control processor 711. This information is sent to the line control block 713 via the interface block 912, the bus 82 and the interface block 716. The line control block 713 transmits, in response to this instruction, the idle/busy information of the extension telephone 112 to the connection control block 913 via the interface block 716, the bus 82 and the interface block 912.

If the connection control block 913 which has received this information decides that the called extension telephone 112 is in an idle state, the connection control block 913 is shifted to intra-office trunk selecting operations. In order to select a vacant intra-office trunk, the connection control block 913 sends the instruction for sending the trunk type information and the idle/busy information stored in the trunk control block 715 in the signal control processor 711 to the trunk control block 715, from the interface block 912 via the bus 82 and the interface block 716. The trunk control block 715 supplies, in response to this instruction, the trunk type information and the idle/busy information to the connection control block 913, via the interface block 716, the bus 82 and the interface block 912. The connection control block 913 selects a vacant intra-office trunk in response to the trunk type information and the idle/busy information. The accommodated position information of that vacant intraoffice trunk on the trunk side of the switching network 51 is stored in the connection control block 913. If the trunk 612 is a vacant intra-office trunk, the accommodated position information of the trunk 612 in the switching network 51 is stored in the connection control block 913. In this example, the trunk 612 is assumed to be an intra-office trunk, so that the outgoing side of the trunk 612 is held to be connected to the trunk side of the switching network 51.

A vacant channel is selected for connecting the calling telephone 111 with one terminal of the intra-office trunk 612. Another vacant channel is selected for connecting the called extension telephone 112 with the other terminal of the intra-office trunk 612. The instruction for sending the idle/busy information of the link stored in the switch control block 714 of the signal control processor 711 is sent to the switch control block 714, via the interface block 912, the bus 82 and the interface block 716. The switch control block 714 which has received this instruction sends the idle/busy information of the link to the connection control block 913 via the block 716, the bus 82 and the interface block 912.

The connection control block 913 performs the matching of the link in accordance with the idle/busy information of the link. The vacant channel is thus selected for connecting the calling telephone 111 with the one terminal of the intra-office trunk 612. The other vacant channel is selected for connecting the called extension telephone 112 with the other terminal of the intra-office trunk 612.

The connection control block 913 stores discriminated accommodated position information of the calling telephone 111, the called extension telephone 112, the two terminals of the intra-office trunk 612 in the switching network 51, and the channel information of the switching network 51 for connecting therebetween. Information is sent from the connection control block 913 via an interface block 912, bus 82, and interface block 716 to the switch control block 715. This information includes: the accommodated position information of the calling telephone 111 and the intra-office trunk 612 in the switching network 51; the channel information of the switching network 51 for the connection therebetween and the instruction for closing the speech path switch; the accommodated position information of the called telephone 112 and the intra-office trunk 612 in the switching network 51; the channel information of the switching network 51 for connecting therebetween and the instruction for closing the speech path switch; and the accommodated position information of the called telephone 111 and the originating register trunk 611 in the switching network 51; the channel information of the switching network 51 for connection therebetween and the instruction for opening the speech path switch.

The switch control block 714 closes the speech path switch in the switching network 51 in response to this instruction. The speech path from the calling telephone 111 to the called extension telephone 112 is completed via the line circuit 211, the switching network 51, the intra-office trunk 612, the switching network 51 and the line circuit 212. At the same time, the switch control block 714 interrupts the speech path from the calling telephone 111 to the originating register trunk 611, via the line circuit 211 and the switching network 51. Further, the speech path is interrupted in the line circuit 212 on the called side, at this instant.

Subsequently to the above described operation, the connection control block 913 supplies the accommodated position information of the line circuit 212 corresponding to the called telephone 112 in the switching network 51 and the instruction for sending a ringing signal to the line control block 713, via the interface block 912, the bus 82 and the interface block 716. Responsive thereto, the ringing signal is sent to the called telephone 112 from the line control block 713. A relay (not shown) in the line circuit 212 sends the ringing signal to the called telephone 112.

Further, to return the ringing tone to the calling telephone 111, the connection control block 913 supplies the accommodated position information of the intra-office trunk 612 in the switching network 51 and the instruction for sending the ringing tone to the trunk control block 715, via the interface block 912, the bus 82 and the interface block 716. In response to this information trunk control block 715 energizes a relay (not shown) in the intra-office trunk 612 to send the ringing tone to the calling telephone 111, via the switching network 51 and the line circuit 211, and to the called telephone 112 through the line circuit 212. In this state, the speech path to the calling telephone 111 is interrupted in the line circuit 211. The connecting condition memory in switch control block 714 stores information transmitted from connection control block 913 via interface block 912, bus 82, and interface block 716. This information includes the connection conditions of the switching network 51 including the accommodated position information of the calling telephone 111, the accommodated position information of one terminal of the intra-office trunk 612, the channel information between the calling telephone 111 and the one terminal of the intra-office trunk 612, the accommodated position information of the called telephone 112, the accommodated position information of the other terminal of the intra-office trunk 612 and the channel information between the called telephone 112 and the other terminal of the intra-office trunk 612. Thereafter, the connection control block 913 transmits the disconnection command to the interface block 716 via the interface block 912 and the bus 82. The connection control processor 911 is disconnected to complete the extension-to-extension connection control operation.

In the connection control operation described above, a vacant intra-office trunk is selected in the switching networks 52, ..., 5m other than the switching network 51 having the calling telephone 111, if the switching network 51 does not contain the intra-office trunk, if there is no vacant intra-office trunk even if the intra-office trunk is contained in the switching network 51, or if there is no vacant channel even if the vacant intra-office trunk is contained in the switching network 51. The trunk selection, the channel selection, and the speech path switch control are similar to those described under item (a) above with respect to the dial tone connection.

(c) Connection for Response by Called Extension Telephone

When the handset of the called extension is taken up to answer the call, a hook switch signal is received by the line circuit 212 and detected by the line control block 713 in the signal control processor 711. When the answer from the called extension telephone 112 is confirmed, the accommodated position information of the called extension telephone 112 in the switching network 51 is stored in the line control block 713. A trigger demand signal for the connection control processor is stored in the connection control processor trigger flag memory of the interface block 716 to trigger the extension of the inter-answer connection.

Assuming that the connection control block 911 is out of the execution of the connection control and that the connection control processor 911 is detecting the trigger demand from the signal control processor, the interface block 912 scans the connection control processor trigger flag memories in the interface block 716, 726, ..., 7m6 sequentially, so as to detect the trigger demand from the signal control processor 711. When the interface block 912 decides that the the type of the triggered demand is an extension inter-answer connection control, the interface block 912 sends a trigger signal to the connection control block 913, to initiate the extension inter-answer connection control.

When the operation of the extension inter-answer connection control is initiated, an instruction for sending the accommodated position information of the called telephone 112 on the line side of the switching network 51 is sent to the line control block 713, via the interface block 912, the bus 82 and the interface block 716. In response to this instruction, the line control block 713 supplies the accommodated position information of the called telephone 112 for storage, in the connection control block 913 in the connection control processor 911, via the interface block 716, the bus 82 and the interface block 912.

Subsequently, to identify the intra-office trunk connected to the called telephone 112 via the channel in the switching network 51, the connection control block 913 judges the memory content of the connection condition memory in the switch control block 714 and sends an instruction for sending the accommodated position information of the intra-office trunk 612 in the switching network 51. That trunk is connected to the called telephone 112 via the channel in the switching network 51. The position information is sent to the switch control block 714, via the interface block 912, the bus 82 and the interface block 716. In response to this instruction, the switch control block 714 judges the content of the connection condition memory and sends the accommodated position information of the intra-office trunk 612 in the switching network 51 to the connection control block 913 for storage therein, the information being sent via the interface block 716, the bus 82 and the interface block 912.

Then, the information and the instruction thus stored in the connection control block 913 are supplied from the connection control block 913 via the interface block 912, the bus 82 and the interface block 716 to the line control block 713. This releases the ringing relay (not shown) in the line circuit 212 to interrupt the ringing signal supplied to the called telephone 112 and to form a speech path from the called telephone 112 to the intra-office trunk 612 via the line circuit 212 and the switching network 51. Subsequently, the accommodated position information of the intra-office trunk 612 of the switching network 51 and the instruction of interrupting the ringing tone, both of which are stored in the connection control block 913, are sent via the interface block 912, the bus 82 and the interface block 716 to the trunk control block 715. This releases the ringing relay (not shown) in the intra-office trunk 612 to interrupt the ring-back tone supplied to the calling telephone 111.

The speech path of the extension inter-connection is thus completed. That speech path extends from the calling telephone 111 to the called telephone 112 via the line circuit 211, the switching network 51, the intraoffice trunk 612, the switching network 51 and the line circuit 212. The connection condition information on the switching network 51 and the instruction for writing-in the information in the connection condition memory are supplied for storage to the switch control block 714, from the connection control block 913, via the interface block 912, the bus 82 and the connection interface block 716.

Thereafter, the connection control block 913 transmits the disconnection command to the interface block 716 via the interface block 912 and the bus 82, so that the connection control processor 911 is disconnected to complete the operation of the extension inter-answer connection control.

In the above described connection control, the extension inter-answer connection control is needed between a plurality of signal control processors and one connection control processor, if an intra-office trunk is not contained in the switching network 51. The connection operations in this case are similar to those in the above described under items (a) and (b) above.

The dial tone connection, the extension-to-extension call connection and the connection for response by the called extension telephone have been descripted above with respect to their connection control operations, respectively. Similar connection control operations are performed for other various types of connection controls such as an originating connection control to central office, a terminating connection control from central office, a tie line connection control, a tandem connection control, an automatic transfer connection control, an abbreviated dial connection control, a variable absence transfer connection control, or the like. Therefore, descriptions of these operations will not be give here.

While a plurality of switching networks 51, 52, . . . , 5m are connected to each other by a junctor 81 in the foregoing embodiment, the present invention is applicable to the case where only one switching network is connected in a similar manner, In the one switching network system, the signal control processor for the on-off control of the speech path in the switching network may be separated from other signal control processors.

Further, the mutually independent memories for storing the state of the speech path of the respective signal control processors may be unified to form a speech path switch memory connected to the connection control processor via an information transfer means.

Still further, in the one switching network system, the signal control processor may be formed of a switch control circuit and the speech path state memory may be connected to the connection control processor.

In the plural-switching networks, the speech path state memory may be provided for the signal control processor corresponding to the switching networks, respectively. Only the control circuits are integrated to form the switch control circuit connected to the connection control processor.

Furthermore, while it is assumed in the above embodiment that each of the signal control processors controls a plurality of various equipment groups, the signal control processors may be formed of a processor having a single function to control the extension's circuit group, the position circuit group and the trunk circuit group, respectively.

Figure 2:
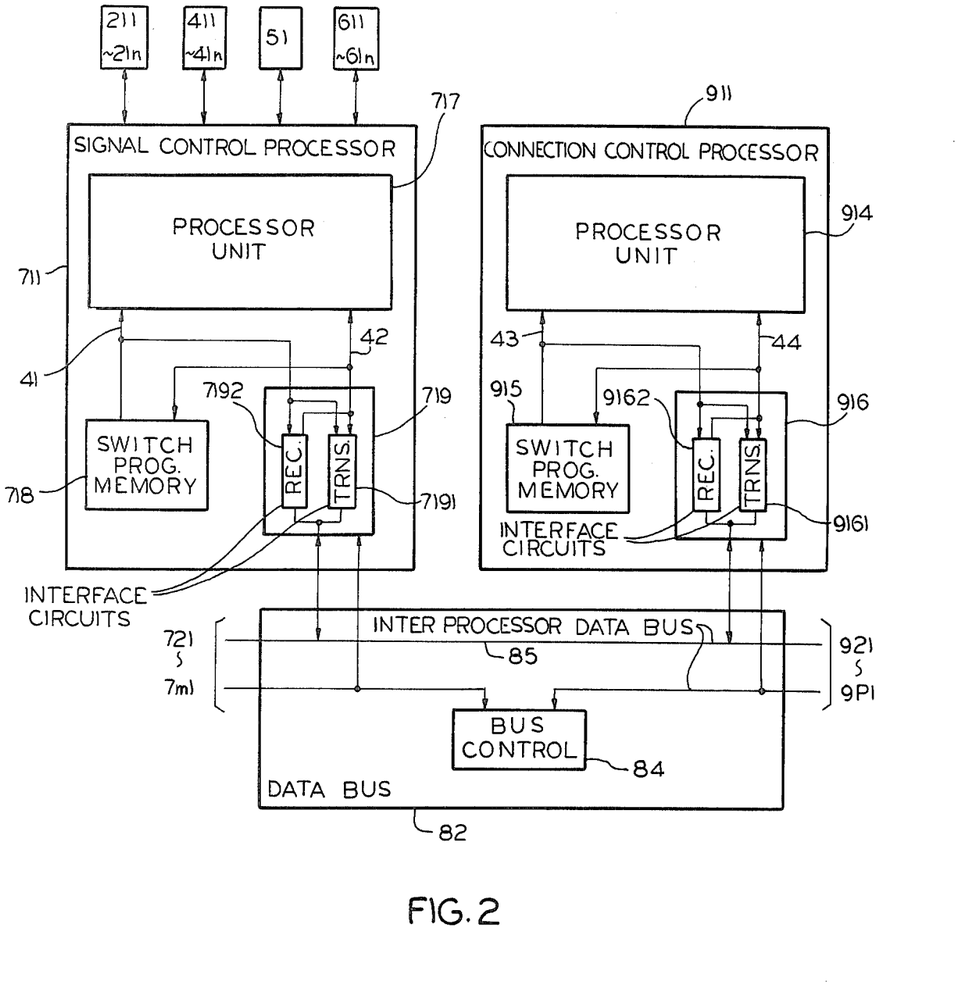
FIG. 2 is a block diagram showing in detail a part of the embodiment shown in FIG. 1.

The foregoing embodiment will be more specifically described referring to FIG. 2 showing the information transfer between any given processors shown in FIG. 1.

Upon transfer of information to the processor 911, the processor 711 operates in such a way that a processor unit 717 supplies an address of the transfer information storing area in an interface circuit 719, which has a temporary memory, i.e., a buffer and a control circuit for transferring information to the interface circuit 719 through an address bus 41. The processor unit 717 is comprised of each of the control blocks 712 through 715. The connection control processor interface 716 is represented by the interface circuit 719. Also, the processor unit 717 supplies, through a bus 42, a data to be written in the transfer information storing area in the interface circuit 719. The stored data is read out and then stored through an inter-processor information transferring bus 85 under the control of a bus control circuit 84, in a transfer information storing area in an interface circuit 916 of the processor 911. The signal control processor interface 912 is depicted as the latter interface circuit 916.

To read out the content stored in the specified address of the interface circuit 916, the processor unit 914 supplies the address information to the interface circuit 916 to permit the read-out of the data stored in the specified address. The processor unit 914 is comprised of the connection control block 913. The read out data is transmitted to the processor unit 914 via a data bus 44. The operation for the information transferred from the processor unit 914 to the processor unit 717 is similar to the above explanation.

In FIG. 2, reference numerals 7191 and 9161 denote interface circuits used for transmission (referred to as transmission interface circuits, hereinafter). The reference numerals 7192 and 9162 denote interface circuits used for reception (referred to as reception interface circuits, hereinafter), respectively. Reference numerals 718 and 915 denote memories for storing the switching programs, respectively.

While the embodiment of FIG. 2 has only two processors, n processors may likewise be employed. The operation of the information transfer between such an indefinite number of processors is similar to the information transfer operation between the two processors.

Figure 3:
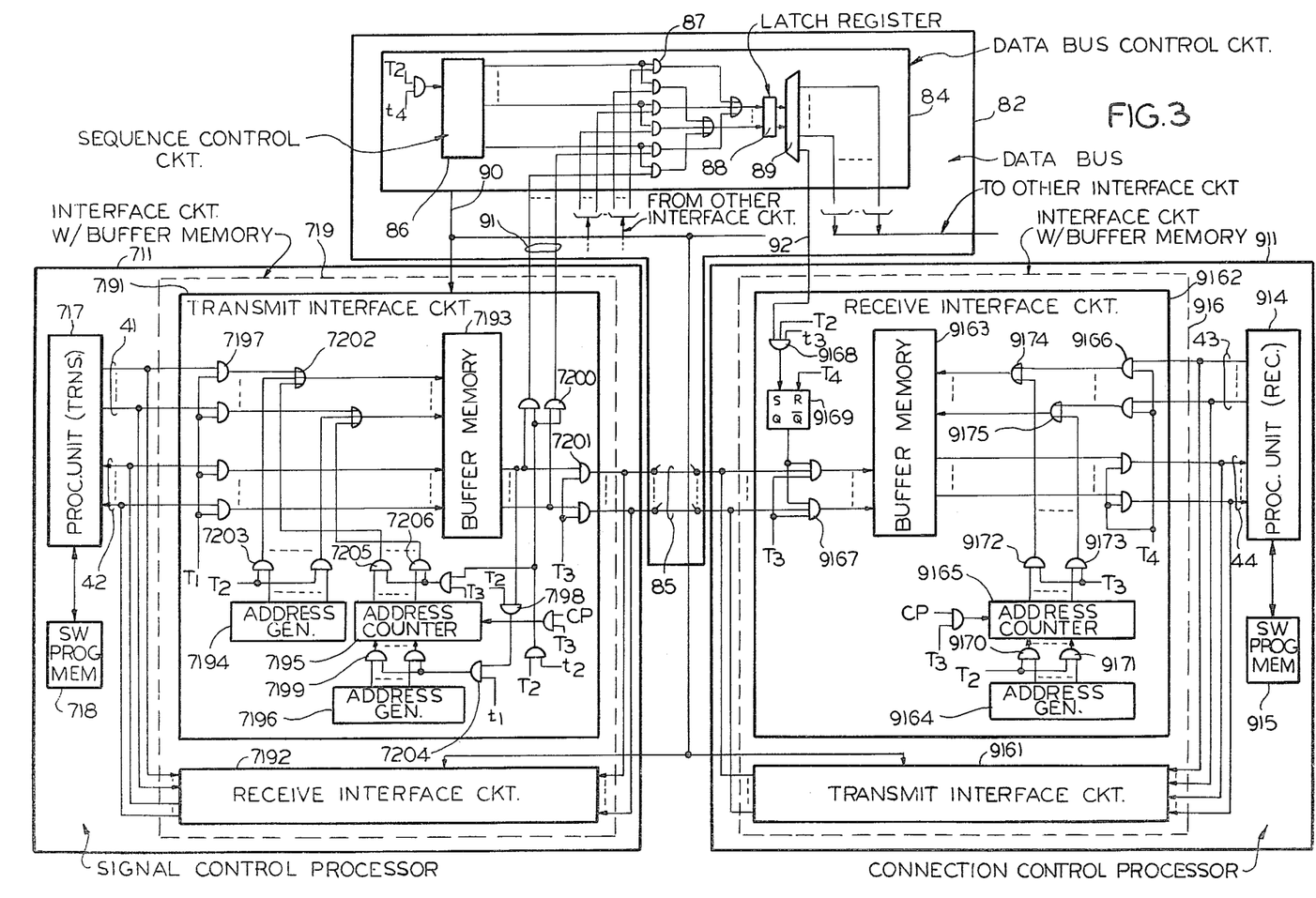
FIG. 3 is a circuit diagram showing in more detail the information transfer circuit part of the embodiment shown in FIG. 1.

The embodiment will be explained in more detail of the embodiment shown in FIG. 3. Referring to FIG. 3, the reference numerals 717 and 914 denote processor units (referred to as processors), respectively. It is assumed that the processor 717 is a transmitting side processor and the processor 914 is a receiving side processor. The reference numerals 719 and 916 denote interface circuits having the buffer memory and the control circuit thereof. The reference numeral 7191 is designated to the transmitting side bus interface circuit, one end of which is connected to the processor 717 through the address bus 41 and the data bus 42. The other end of the bus interface circuit is connected to other processors via the inter-processor information transfer bus 85.

The reference numeral 9162 denotes the receiving side bus interface circuit, one end of which is connected to the processor 914 through the address bus 43 and the data bus 44. The other end of the bus interface circuit is connected to other processors via the inter-processor information transfer bus 85. The reference numeral 7192 denotes the receiving side bus interface circuit, one end of which is connected to the processor 717 through the address bus 41 and the data bus 42, and the other end of which is connected to other processors through the inter-processor information transfer bus 85. The reference numeral 9161 is designated to the transmitting side bus interface circuit, one end of which is connected to the processor 914 via the address bus 43 and the data bus 44, and the other end of which is connected to other processors through the bus 85.

The bus control circuit 84 is a circuit for detecting a trigger from a transmitting side processor. Circuit 84 also identifies the receiving side processor in accordance with the number information of the receiving side processor which has been sent from that transmitting side processor. Control circuit 84 determines which inter-processor information transfer bus is used between the transmitting side processor and the receiving side transmitter. The bus control circuit 84 is connected to the respective processors and control lines such as lines 91 and 92.

The control circuit 84 has a pulse generating circuit (not shown) for generating various clock pulses and a count up pulse sequence. The various kinds of pulses generated by this pulse generating circuit are supplied to the respective bus interface circuits on the transmitting and receiving sides with transmission being through a clock signal line 90 to maintain the synchronization of the operations of the whole system.

In this embodiment of the present invention, this pulse generating circuit generates the timing pulses T1, T2, T3, T4, t1, t2, t3, and t4 and the count up pulses CP, which are illustrated in FIGS. 4A through 4I.

Figure 5:
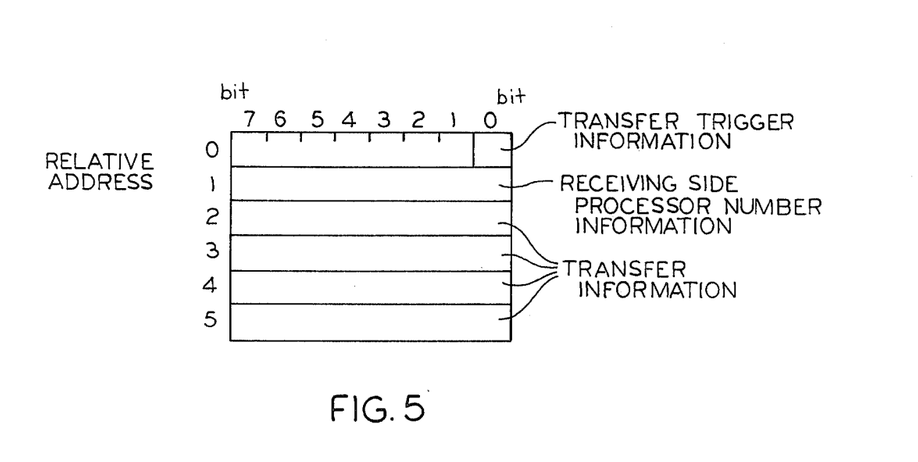
FIG. 5 is an explanatory diagram showing the memory states in a temporary memory shown in FIG. 3.

The buffer memory 7193 (FIG. 3) has addresses within the range which the processor 717 can directly designate by an address. The write-in and read-out of buffer memory 7193 is controlled directly by the processor 717. The transfer information to be transmitted from the processor 717 to other processors is written in the memory 7193. One example of the format of the transfer information to be written in the memory 7193 is illustrated in FIG. 5. The content of this format as shown in FIG. 5 is stored in the absolute addresses a through a +5 arranged at the top of the buffer memory 7193. More specifically, the content of the relative address 0 is stored in the absolute address a, that of the relative address 1 in the absolute address a+1, and so on.

Further, a buffer memory identical to the memory 7193 is disposed in the reception interface circuit 9162, which is provided in connection with the processor 914. The buffer memory 9163 is a memory, having allotted addresses within the range which the processor 914 can designate by a direct address. The writing and reading of this address can be directly controlled by the processor 914. The memory 9163 has the transfer information sent from other processors to the processor 914, written in under the format shown in FIG. 5.

The content is stored under the absolute addresses b through b+5 arranged at the top of the memory 9163. More specifically, the content of the relative address 0 is stored in the absolute address b, that of the relative address 1 in the absolute address b+1, and so on. Further, a temporary memory identical to the memory 9163 is provided in the transmitting side bus interface circuit 9161, which is provided in connection with the processor 914. The absolute addresses a and b satisfy the following condition; a−b>5 (a≠b) or b−a>5 (a≠b). The information transferred to the receiving side of the processor from the transmitting side processor is in a six byte format as shown in FIG. 5. The transfer trigger information is stored in the bit 0 of the relative address 0 of the transfer information. The receiving side processor number is stored in the relative address 1, and the data to be actually used in the receiving side processor are stored in the relative addresses 2, 3, 4 and 5.

In the transfer of information to the receiving side processor 914, the processor 717 transmits the address information of the absolute address a of the buffer memory 7193, via the address bus 41. Also, it transmits through the data bus 42 the receiving side processor number, to be written in the relative address a+1 of the memory 7193. This operation is performed through the path from the transmitting side processor 717 to the memory 7193 via the address bus 41 and the data bus 42, AND gates 7197 and OR gates 7202. Further, this operation is performed during the timing $T_1$ shown in FIG. 4A. Similarly, the data to be transferred from the transmitting side processor to the receiving side processor is written in the absolute addresses a+2 through a+5 of the memory 7193 sequentially by on the byte-by-byte basis. The address information stored at the absolute address a of the memory 7193 is transmitted through the address bus 41, while the transfer trigger information to be written in the memory 7193 is transmitted through the data bus 42, to enable the write-in of the address information in the absolute address a.

Figure 4:
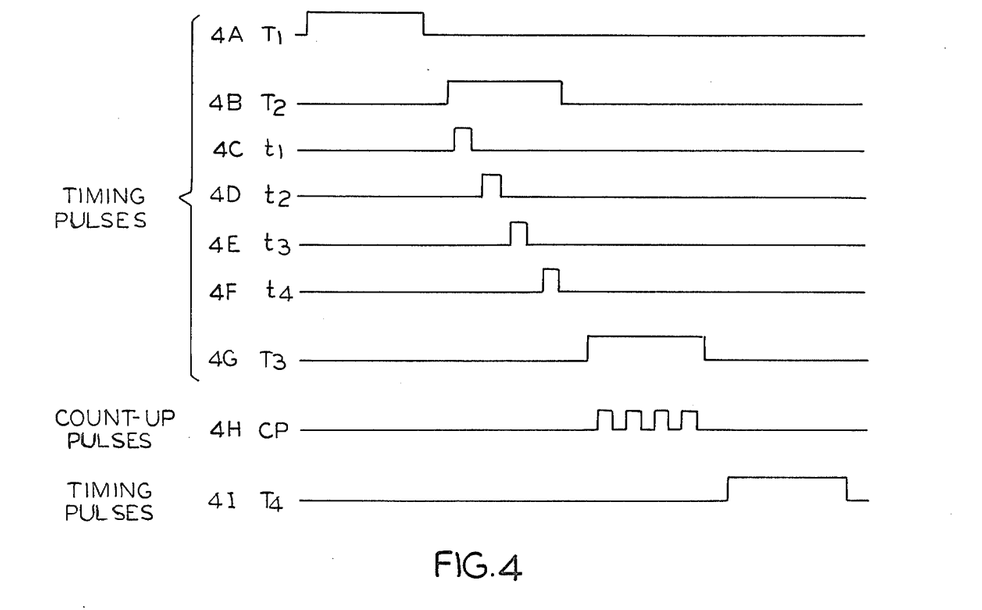

The write-in of the information supplied from the processor 717 in the absolute addresses a through a+5 is executed during the timing $T_1$ shown in FIG. 4A. The processor 717 controls the write-in sequence in such a way that the transfer trigger information is written lastly as mentioned in the above.

During the subsequent period $T_2$ shown in FIG. 4B, the information supplied from a buffer memory address generating circuit 7194, for producing the information relating to the absolute address a of the memory 7193, is supplied to the address bus 41 via AND gates 7203 and the OR gates 7202 to designate the address in the memory 7193. As a result, the content in the absolute address a in the memory 7193 (i.e., the transfer trigger information) is read out and applied to one input terminal of an AND gate circuit 7198. This transfer trigger information is applied to one input terminal of each AND gate 7199 via the AND gate 7198 and an AND gate 7204 at the timing $t_1$, during the timing period $T_2$ shown in FIGS. 4B and 4C.

A memory address generating circuit 7196 is a circuit for producing the address information at the absolute address a+1 of the memory 7193. This address information is supplied to the input terminal of a buffer memory address counter 7195 through the AND gates 7199. The buffer memory address counter 7195 has a parallel output function. The address information in the address a+1 is preset into the counter 7195 by its parallel input function so that the counter 7195 is prepared for the initiation of counting operation. The preset and the preparation operation are executed at the timing $t_1$ during the timing period $T_2$. At the subsequent timing $t_2$ during the timing period $T_2$, the parallel output information supplied from the memory address counter 7195 is supplied to the address bus 41 via AND gates 7205, . . . , 7206 so as to designate the address in the memory 7193.

The content at the absolute address a+1 of the memory 7193, i.e., the receiving side processor number information, is read out and applied to one input terminal of each AND gate 7200. This information is supplied to the bus control circuit through the control line 91 at the timing t₂ during the timing period T₂. At the bus control circuit 84, the sequence control circuit 86 is always checking for an occurrence of the trigger from a processor, by scanning all the processors.

If the transfer trigger demand is produced from a certain processor, the scanning is interrupted and the sequence control circuit 86 produces a signal to an output lead corresponding to that processor in question. If the control circuit 84 is triggered by the transmitting side bus interface circuit 7191 corresponding to the processor 717, the sequence control circuit 86 produces a signal to an output lead corresponding to the processor 717. This signal is applied to one input terminal of each of a corresponding AND gate group in an AND gate circuit 87.

The sequence control circuit 86 interrupts its scanning and keeps producing the signal to the one input terminal of each of the AND gate group. The receiving side processor number information, sent from the transmitting side bus interface circuit 7191 via the control line 91, is supplied to the input terminal of a latch register 88 through the AND gate circuit 87 and OR gates in the control circuit 84. This information is stored in the latch register 88. The stored information is then supplied to a decoder 89 for expansion to produce an output signal at an output lead of the decoder 89. The signal corresponding to the receiving side processor number.

The output leads of the decoder 89 corresponding to the respective processors are connected to the receiving side bus interface circuits in the respective processors. Assume now that the receiving side processor in question is the processor 914. A signal is present on the control line 92 between the receiving side bus interface circuit 9162 corresponding to the processor 914 and the bus control circuit 84. This signal is supplied to one of the input terminals of an AND gate 9168 in the receiving side bus interface circuit 9162, and also to an S terminal of a flip-flop circuit 9169 at the timing t₃ during the timing period T₂. The flip-flop circuit 9169 is set to produce a signal from its output terminal Q. This signal is applied to one of the terminals of each AND gate 9167. At the following timing t₄ during the timing period T₂, the sequence control circuit 86 in the bus control circuit 84 is released from its scanning interruption condition. Then it resumes its scanning and the trigger detection operation with respect to the bus control circuit 84.

Then, the timing is shifted to the timing period T₃ shown in FIG. 4G. During this period T₃, the count up pulses CP shown in FIG. 4H are applied to the address counter 7195. When the first count up pulse CP is applied to the counter 7195, its content is replaced by the content of the absolute address a+2 of the memory 7193. The address information at this absolute address a+2 comes out on the address bus 41 through the AND gates and the OR gates and then is supplied to the memory 7193. The transfer information read from the memory 7193 comes out on the bus 85 via AND gates 7201. Accordingly this transfer information is applied to one of the input terminals of AND gates 9167 arranged at the entrance of the receiving side bus interface circuit which corresponds to the receiving side processor.

Only the receiving side bus interface circuit 9162 is designated by the bus control circuit 84, supplies the transfer information supplied from the bus interface circuit 7191 to the memory 9163 through the AND gates 9167 in the receiving side bus interface circuit 9162.

On the other hand, in the interface circuit 9162, a temporary memory address generating circuit 9164 produces the address information relating to the absolute address b+2 in the temporary memory 9163. The generated address information is applied to the input terminals of a memory address counter 9165 through AND gates 9170, . . . , 9171 during the timing period T₂. The address counter 9165 has parallel input and output functions.

The address information with respect to the absolute address b+2 is preset by the parallel input function to prepare the initiation of the counter operation. The preset and preparation operation for the initiation of the counter operation are performed during the timing period T₂ shown in FIG. 4B. During the subsequent period T₃, the address information with respect to the absolute address b+2 of the memory 9163 (which is obtained as the parallel output information from the address counter 9165) is supplied to the memory 9163 via AND gates 9172, . . . , 9173, OR gates 9174, . . . , 9175 and the address bus 43. As a result, the transfer information (which has been stored at the absolute address a+2 of the memory 7193 and sent from the transmitting side bus interface circuit 7191) is stored at the absolute address b+2 of the memory 9163. Under this state, the interface circuits 7191 and 9162 are assumed to be in synchronism.

When the second count up pulse CP is subsequently applied to the address counter 7195, its content is replaced by the content at the absolute address a+3 in the memory 7193. When the second count up pulse CP is applied to the address counter 9165, its content is replaced by the content at the absolute address b+3 of the memory 9163. The information at absolute address a+3 of the memory 7193 is thus transferred to the absolute address b+3 of the temporary memory 9163, for storage.

When the third count up pulse CP is generated, the information stored at the absolute address a+4 of the memory 7193 is transferred to and then stored in the absolute address b+4 of the memory 9163. Similarly, the fourth count up pulse CP causes the information stored in the absolute address a+5 of the memory 7193 to be transferred to and then stored in the absolute address b+5 of the temporary memory 9163.

Through the transfer operation as described above, the information stored in the memory 7193 in the interface circuit 7191 corresponding to the transmitting side processor 717 is transferred to and stored in the memory 9163 in the interface circuit 9162 corresponding to the receiving side processor 914.

During the subsequent timing period T₄ shown in FIG. 4I, the receiving side processor 914 supplies the address information with respect to the absolute address b+2 of the temporary memory 9163 to the address bus 43. This address information is further supplied to the memory 9163 through AND gates 9166. The memory 9163 supplies this information to the processor 914 via the AND gates 9166 and the data bus 44 and consequently to the processor 914.

In this way, the data stored in the memory 9163 corresponding to the absolute addresses b+3, b+4 and b+5 are received by the processor 914 subsequently.

While the foregoing description has been given about the information transfer between two processors, the same description applies to the information transfer between more than two processors.

Similarly, the two-way simultaneous transfer of information in the foregoing embodiment may be replaced by one-way transfer. Such one-way transfer may lower the transfer efficiency, but has the advantage of simplicity.

While the invention has been described in detail with respect to preferred embodiments, it should be noted that changes and modifications can be made without departing from the spirit and scope of the invention as defined in the accompanying claims.

What is claimed is:

1. A distributed control type switching system for use in telephone systems having telephone stations served by line circuits, attendant consoles served by position circuits, and central office lines served by trunk circuits, said switching system comprising:
   a. speech-path selecting means connected to line circuits associated with telephone sets, to trunk circuits associated with central office lines, and to position circuits associated with attendant consoles;
   b. a distributed first plurality of processor means connected to said speech-path selecting means, said line circuits, said trunk circuits and said position circuits, respectively, means controlled by said first processor means for transmitting control signals to said speech-path selecting means, said line circuits, said trunk circuits, and said position circuits, respectively, and for receiving status signals from said speech-path selecting means, said line circuits, said trunk circuits and said position circuits, respectively;
   c. a distributed second plurality of processor means for controlling various connections between said speech-path selecting means and said line circuits, said trunk circuits, and said position circuits; and
   d. an information transfer means connected between said first plurality and said second plurality of processors means for transmitting switching control signals between said first and second processor means, whereby switching control functions are distributed throughout said system.

2. A distributed control type switching system as claimed in claim 1, wherein each of said first and second processor means has a first memory means for storing the sequence of a switching program, a second memory means for storing the operation conditions and the connection conditions of said line circuits, said trunk circuits, said position circuits and said speech-path selecting means, and interface circuit means formed of a part of said second memory for transferring information, and wherein said information transfer means has a control circuit means for maintaining synchronization between said first and second processor means.

3. A distributed control type switching system as claimed in claim 2, wherein each of said interface circuit means has a transmitting side interface circuit and a receiving side interface circuit, and means for transferring information through said transmitting side and said receiving side independently to each other.

4. A distributed switching control system comprising a plurality of separate switching systems, each of said separate switching systems having its own separate switching network, whereby there are a plurality of such switching networks, each having its own characteristics, first data processor means individually associated and compatible with each of said separate switching networks, second data processor means common to all of said separate switching networks, and means for exchanging a common form of signals between said first and second data processor means for controlling said separate switching networks as if they were a single integrated network despite any differences in the characteristics of the separate switching networks.

5. The control system of claim 4 wherein each of said switching networks has a line side and a trunk side, means for selectively interconnecting predetermined access points on said line side and said trunk side, and means associated with each of said access points for giving information concerning its status to the first processor means associated with the switching network with which said access point is associated.

6. The control system of claim 5 wherein said line side points of access are connected to line circuits associated with subscriber lines, and to position circuits associated with attendant consoles; and said trunk side points of access are connected to trunk circuits associated with central office lines.

7. The system of claim 6 and a plurality of data busses extending between said processor means, and interface means associated with each of said processor means for enabling such processor means to exchange signals via said data busses.

8. The system of claim 7 and means in said interface means for enabling the associated processor means to send data over and independently therefrom to receive data from said busses, whereby each of said processor means may simultaneously exchange two-way communication with other of said processor means.

9. The control system of claim 4 wherein said switching networks are part of a telephone system and said networks include a plurality of speech path switches.

10. A telephone network comprising a plurality of individual switching networks distributed throughout said telephone network, a plurality of functionally different lines distributed throughout said telephone network, each of said lines being assigned to an individually associated one of said switching networks, a plurality of processor means distributed throughout said telephone network and assigned to said lines according to their functional characteristics, means for storing signals representing the status of each of the individual lines in an associated one of said processor means assigned to serve that line, common means comprising other of said processor means for directing the processor means associated with said lines, and means responsive to said direction of said associated processor means for completing speech paths through said switching networks to interconnected selected ones of said lines.

11. The telephone network of claim 10 and junctor means extending between said switching networks for carrying speech signals and data busses extending between said processor means for carrying control signals.

12. The telephone network of claim 11 and means in said switching networks for completing connections via said junctor means separately from connections via said data busses, whereby distributed connections are completed through said network.

13. The telephone network of claim 15 and means for completing go and return legs of said junctors and data busses independently of each other, whereby signals may be sent and received independently of each other.

14. In a combination, a common control device connected to a plurality of switching systems for a plurality of terminal equipments and at least one switching facility external to said combination; each of said groups having a plurality of connection operation equipments connected to said common control device, each connection operation equipment in each of preselected ones of said groups being assigned for at least one specific connection operation in said each group and for producing a status signal indicating whether or not the connection operation assigned thereto is carried out thereby, the connection operation equipment in at least a remaining one of said groups being classified into a plurality of classes, each connection operation equipment of each of said classes having at least one other connection operation specifically assigned thereto and producing another status signal representative of whether or not the connection operation specific to said each class is carried out thereby, the connection operation equipment of predetermined ones of the preselected ones of the preselected groups in said switching systems being used for making connections to said plurality of terminal equipment, the connection operation equipment of at least a predetermined one of said classes in said switching systems being used for making connections to said at least one switching facility, each of the connection operation equipment of said predetermined groups and of said at least one predetermined class being further capable of producing a connection request signal in response to a call arriving thereat from one of said plurality of terminal equipment and said at least one switching facility that is actually connected thereto, said call requesting a communication path to be established through at least one of said switching systems in accordance with one of a plurality of connection types that is specified thereby, said connection request signal being representative of said one connection type, said communication path being established with those of the preselected groups in said at least one switching system which is selected in compliance with said one connection type and with those of the connection operation equipment of at least one predetermined class in said at least one switching system, with those of the preselected groups in said at least one switching system and of said plurality of classes therein selected in compliance with said one connection type and with those of the connection operation equipment in the selected ones of the preselected groups and of said plurality of classes selected with reference to the status signals produced by the connection operation equipment of said selected ones of the preselected groups and of said plurality of classes and in the respective prescribed orders when said connection request signal is produced by the connection operation equipment in that one of said predetermined groups which is in said at least one switching system, and with the selected connection operation equipment and the connection operation equipment by which said connection request signal is produced carrying out the connection operations assigned thereto in either case; the improvement wherein said common control device comprises:

a. at least one equipment control microprocessor means connected to the connection operation equipment of each of the groups in said switching systems for memorizing the status signals produced by the connection operation equipment connected thereto, whereby there are at least as many microprocessor means as there are groups in said switching systems, each of the equipment control microprocessor means being operated responsive to said connection request signal for producing a trigger demand signal indicative of said one connection type;

b. a predetermined number of connection control microprocessor means, each for memorizing switching programs corresponding to the respective connection types used in establishing the communication paths;

c. an information transfer means between the equipment control microprocessor means connected to the connection operation equipment in said switching systems and the connection control microprocessor means of said predetermined number for transferring at least said trigger demand signal from said each equipment control microprocessor means to said connection control microprocessor means of said predetermined number as a triggering signal indicative of said one connection type;

d. each connection control microprocessor means, when the switching programs memorized therein are not used in establishing communication paths, being selected in a predetermined order by said triggering signal, the selected connection control microprocessor means being responsive to said triggering signal for identifying said one connection type, operating responsive to one of the switching programs memorized therein that corresponds to said one connection type for selecting those of the equipment control microprocessor means which are connected to the connection operation equipment of relevant ones of said selected groups and said selected ones of the preselected groups in said at least one switching system and of said plurality of classes therein, supplying data request signal in compliance with said one switching program to the selected equipment control microprocessor means through said information transfer means, receiving via said information transfer means the status signal memorized in said selected equipment control microprocessor means, selecting connection operation equipment with reference to the received status signals and in the respective prescribed orders, and supplying operation instruction signals in compliance with said one switching program to said selected equipment control microprocessor means through said information transfer means; and e. said selected equipment control microprocessor means being responsive to said operation instruction signals for making said selected connection operation equipment and the connection operation equipment by which said connection request signal is produced carry out the connection operations assigned thereto.

15. A common control for a plurality of switching systems serving terminal equipment, each of said switching systems having any of many different types of equipment, each of said switching systems being subdivided into functional equipment groups for making connections to said terminal equipment, means associated with each of said groups of equipments for giving first status signals responsive to progress during a completing connection, at least one of said groups having equipment classified into a plurality of classes for making connections to equipment connection operating means associated with said classes of equipment for giving second status signals responsive to progress during a completing connection, means for completing connections to one of a plurality of connection types of equipment responsive to calls arriving through said groups of equipments from said terminal equipment, means responsive to said first status signals for completing a requested type of connection involving said groups of equipment and responsive to said second status signals for completing a requested type of connection involving said classes of equipment, first microprocessor means individually associated with each of said groups according to the function thereof and operated responsive to a memorization of said first status signals for producing a connection type indicating trigger signal, second preprogrammed microprocessor means shared by all of said switching systems regardless of the type of equipment used by said system, said second microprocessor means being common to and load shared by said switching systems, information transfer means interconnecting said first and second microprocessor means for transferring at least said trigger signal in the form of a triggering signal which is indicative of the desired connection type, means responsive to said triggering signal for assigning idle second microprocessor means in a predetermined order to control a relevant first microprocessor means associated with a desired one of said groups, means responsive to the assignment of said idle second microprocessor means for exchanging preprogrammed control signals and at least one of said status signals with said relevant first microprocessor means via said information transfer means, and means responsive to said exchange for completing a desired switch connection through at least one of said switching systems.

* * * * *

UNITED STATES PATENT AND TRADEMARK OFFICE
CERTIFICATE OF CORRECTION

PATENT NO. : 4,210,782
DATED : July 1, 1980
INVENTOR(S) : Kazunori Fujita

It is certified that error appears in the above-identified patent and that said Letters Patent are hereby corrected as shown below:

Col. 1, Line 18, "processors" s/b --processor--

Col. 3, Line 4, "microprocessor" s/b --microprocessors--

Col. 3, Line 7, after "invention" insert --dispenses--

Col. 3, Line 14, after "helping" insert --to--

Col. 3, Line 35, "4a;14" s/b --4a - --

Col. 3, Line 49, "brought" s/b --thought--

Col. 5, Line 39, "7mll" s/b --7ml--

Col. 5, Lines 54-55, "processors" s/b --processor-- (two occurrences)

Col. 9, Line 50, "of" s/b --for--

Col. 15, Line 17, "plurarity" s/b --plurality--

Col. 15, Line 24, "descripted" s/b --described--

UNITED STATES PATENT AND TRADEMARK OFFICE
CERTIFICATE OF CORRECTION

PATENT NO. : 4,210,782
DATED : July 1, 1980
INVENTOR(S) : Kazunori Fujita

It is certified that error appears in the above-identified patent and that said Letters Patent are hereby corrected as shown below:

Col. 15, Line 41, "," s/b --.--

Col. 15, Line 64, "plurarity" s/b --plurality--

Col. 19, Line 26, ". The" s/b --, the--

Col. 24, Line 41, after "selecting" insert --said--

Signed and Sealed this

Fourth Day of November 1980

[SEAL]

Attest:

SIDNEY A. DIAMOND

Attesting Officer

Commissioner of Patents and Trademarks